United States Patent
Imoto et al.

(10) Patent No.: US 7,078,126 B2
(45) Date of Patent: Jul. 18, 2006

(54) METHOD FOR PRODUCTION OF HYDROGEN STORAGE ALLOY FOR USE IN ALKALINE STORAGE BATTERIES

(75) Inventors: Teruhiko Imoto, Kaizuka (JP); Masutaka Ouchi, Kuzatsu (JP); Yohei Hirota, Itano-gun (JP); Kikuko Kato, Hirakata (JP); Nobuyuki Higashiyama, Ikeda (JP); Mamoru Kimoto, Hirakata (JP); Shin Fujitani, Kobe (JP); Koji Nishio, Kyoto (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 348 days.

(21) Appl. No.: 10/334,287

(22) Filed: Dec. 31, 2002

(65) Prior Publication Data

US 2003/0116235 A1 Jun. 26, 2003

Related U.S. Application Data

(62) Division of application No. 09/720,615, filed on Dec. 26, 2000, now Pat. No. 6,576,367.

(51) Int. Cl.
*H01M 4/32* (2006.01)
*H01M 4/52* (2006.01)
*H01M 4/58* (2006.01)

(52) U.S. Cl. ...................... 429/223; 420/900
(58) Field of Classification Search ............... 429/900, 429/223; 420/900
See application file for complete search history.

(56) References Cited

U.S. PATENT DOCUMENTS

| 5,738,953 | A | 4/1998 | Lichtenberg et al. |
| 5,858,571 | A | 1/1999 | Ishii et al. |
| 5,879,429 | A | 3/1999 | Yamamura et al. |
| 5,900,334 | A | 5/1999 | Wada et al. |
| 5,935,732 | A | 8/1999 | Matsumura et al. |
| 6,255,018 | B1 | 7/2001 | Ise et al. |

FOREIGN PATENT DOCUMENTS

| JP | 60 190570 | 9/1985 |
| JP | 05 225975 | 9/1993 |

(Continued)

*Primary Examiner*—Patrick Joseph Ryan
*Assistant Examiner*—Julian Mercado
(74) *Attorney, Agent, or Firm*—W. F. Fasse; W. G. Fasse

(57) ABSTRACT

A method of producing a hydrogen storage alloy, for use in alkaline storage batteries, includes two steps. A first step involves preparing alloy particles having a $CaCu_5$-type crystal structure and the compositional formula $MmNi_x\text{-}Co_yMn_zM_{1-z}$, wherein M represents at least one element selected from the group consisting of aluminum (Al) and copper (Cu), $3.0 \leq x \leq 5.2$, $0 \leq y \leq 1.2$, $0.1 \leq z \leq 0.9$, and $4.4 \leq x+y+z \leq 5.4$. A second step involves immersing the alloy particles in an acid treating solution containing a cobalt compound and a copper compound, each in the amount of 0.1 to 5.0% by weight based on the weight of the alloy particles, and an organic additive to remove oxide films from and to reductively deposit cobalt and copper on a surface of each alloy particle to form a surface region surrounding a bulk region and having a graded composition. When the sum in percentage of numbers of cobalt (Co) atoms and copper (Cu) atoms present in the surface region is given by a and that in the bulk region by b, the relationship $a/b \geq 1.3$ is satisfied.

6 Claims, 2 Drawing Sheets

FOREIGN PATENT DOCUMENTS

| | | |
|---|---|---|
| JP | 07 326353 | 12/1995 |
| JP | 8 287909 | 11/1996 |
| JP | 09-007585 | 1/1997 |
| JP | 09 073898 | 3/1997 |
| JP | 09 213319 | 8/1997 |
| JP | 09 302431 | 11/1997 |
| JP | 10 106557 | 4/1998 |
| JP | 10 149824 | 6/1998 |
| JP | 10 162820 | 6/1998 |
| WO | WO 97/50135 | 12/1997 |

METHOD FOR PRODUCTION OF HYDROGEN STORAGE ALLOY FOR USE IN ALKALINE STORAGE BATTERIES

CROSS-REFERENCE TO RELATED APPLICATION

This application is a Divisional of U.S. application Ser. No. 09/720,615, filed Dec. 26, 2000, now U.S. Pat. No. 6,576,367, issued Jun. 10, 2003.

TECHNICAL FIELD

The present invention relates to a hydrogen storage alloy useful for a negative electrode of an alkaline storage battery and especially to a method for production thereof.

BACKGROUND ART

A nickel-hydrogen storage battery has been recently noted as a new alkaline storage battery because of its high capacity, at least twice as high as that of nickel-cadmium batteries, and its environmental friendly nature. With the spread of portable instruments, this nickel-hydrogen storage battery is expected to further increase its performance.

A hydrogen storage alloy, when incorporated in a negative electrode of the nickel-hydrogen storage battery, generally undergoes spontaneous oxidation to form an oxide layer on its surface. Accordingly, a hydrogen storage alloy electrode fabricated from such a hydrogen storage alloy, when used as a negative electrode of the nickel-hydrogen storage battery, presents a problem of low initial battery capacity that is attributed to the initial low activity of hydrogen storage alloy.

A method has been recently proposed, for example, in Japanese Patent Laying-Open No. Hei 5-225975, which immerses a hydrogen storage alloy in an acid solution, such as a hydrochloric acid solution, to remove an oxide layer formed on its surface.

This method contemplates to remove an oxide layer from a surface of the hydrogen storage alloy by immersing it in the acid solution. However, nickel and cobalt hardly elute into the acid solution so that active sites as of metallic nickel (Ni) and cobalt (Co) appear on the hydrogen storage alloy surface.

Upon removal of the oxide layer by the above-described method, the active sites as of metallic nickel and cobalt appear on the hydrogen storage alloy surface, so that the initial discharge capacity is increased. The reduction of electrical contact resistance between alloy particles also results to increase the high-rate discharge capacity to a slight degree. However, the electrical contact resistance between alloy particles is still too high to achieve a marked improvement in high-rate discharge capacity. Also, the method is still insufficient to prevent the buildup of pressure in the battery and improve a charge-discharge cycle life of the battery.

It is an object of the present invention to provide a hydrogen storage alloy which, when fabricated into an electrode for alkaline storage batteries, can provide an excellent charge-discharge cycle life performance, prevent the buildup of battery's internal pressure during overcharge and improve high-rate discharge characteristics, and also to provide a method for production thereof.

DISCLOSURE OF THE INVENTION

The hydrogen storage alloy of the present invention, for use in alkaline storage batteries, has a $CaCu_5$-type crystal structure and is represented by the compositional formula $MmNi_xCo_yMn_zM_{1-z}$, (wherein M represents at least one element selected from the group consisting of aluminum (Al) and copper (Cu); x is a nickel (Ni) stoichiometry and satisfies $3.0 \leq x \leq 5.2$; y is a cobalt (Co) stoichiometry and satisfies $0 \leq y \leq 1.2$; z is a manganese (Mn) stoichiometry and satisfies $0.1 \leq z \leq 0.9$; and the sum of x, y and z satisfies $4.4 \leq x+y+z \leq 5.4$). Characteristically, the hydrogen storage alloy has a bulk region surrounded by a surface region. The bulk region has a $CaCu_5$-type crystal structure and a substantially uniform composition while the surface region has a graded composition. When the sum of percentages by number of cobalt (Co) atoms and copper (Cu) atoms present in the surface region is given by a and the sum of percentages by number of cobalt (Co) atoms and copper (Cu) atoms present in the bulk region is given by b, the relationship $a/b \geq 1.3$ is satisfied.

In the present invention, the percentage by number of cobalt (Co) or copper (Cu) atoms present in the bulk or surface region may be referred to in terms of atomic %.

As stated above, in the hydrogen storage alloy of the present invention, the bulk region is a region that has a $CaCu_5$-type crystal structure and a substantially uniform composition. The surface region is a region that surrounds the bulk region and has a graded composition. This surface region is the region of the hydrogen storage alloy particle that undergoes a change in composition when it is immersed in an acid treating solution according to the production method of the present invention which will be described later. By this immersion treatment, any oxides present on an alloy particle surface is removed while cobalt and copper are reductively deposited. As a result, the surface region is allowed to contain the increased amounts of cobalt and copper atoms compared to the bulk region. As-described above, when the sum of percentages by number of cobalt atoms and copper atoms present in the surface region is given by a and the sum of percentages by number of cobalt atoms and copper atoms present in the bulk region is given by b, the relationship $a/b \geq 1.3$ is satisfied. If a/b falls below 1.3, it may become difficult to obtain the effect of the present invention that improves a charge-discharge cycle life performance by lowering the contact resistance between hydrogen storage alloy particles to thereby increase a discharge capacity. It may also become hard to obtain the further effect of the present invention that not only prevents the build-up of battery's internal pressure during overcharge but also improves high-rate discharge characteristics.

In the present invention, the region that encompasses a surface and its vicinity and has a graded composition is defined as the surface region, as contrary to the bulk region that has a substantially uniform composition. The surface region is generally observed to have a composition gradient such that the percentages by number of cobalt and copper atoms present therein increase toward the surface. Accordingly, the sum of percentages by number of those atoms present in the surface region, a, is determined by an average value in the surface region. Since the sum of percentages by number of those atoms measured at an intermediate depth of the surface region generally comes close to the average value in the surface region, the measured value may be taken as the sum of percentages by number of cobalt and copper atoms present in the surface region.

When the hydrogen storage alloy having the above-specified crystal structure and compositional formula is used for negative electrode material of an alkaline storage battery, the negative electrode shows the suppressed corrosion in an electrolyte to absorb the increased amount of hydrogen. This is the reason why the present invention uses the hydrogen storage alloy having such crystal structure and composition.

The surface region generally extends inwardly from an alloy particle surface to the depth of 80 nm.

The hydrogen storage alloy electrode of the present invention, for use in alkaline storage batteries, is obtained by loading the hydrogen storage alloy of the present invention in an electrically conductive substrate such as a punching metal.

The method for producing a hydrogen storage alloy of the present invention comprises a first step wherein alloy particles are prepared having a $CaCu_5$-type crystal structure and represented by the compositional formula $MmNi_xCo_yM_zM'_{1-z}$ (wherein M represents at least one element selected from the group consisting of aluminum (Al) and copper (Cu); x is a nickel (Ni) stoichiometry and satisfies $3.0 \leq x \leq 5.2$; y is a cobalt (Co) stoichiometry and satisfies $0 \leq y \leq 1.2$; z is a manganese (Mn) stoichiometry and satisfies $0.1 \leq z \leq 0.9$; and the sum of x, y and z satisfies $4.4 \leq x+y+z \leq 5.4$), and a second step wherein the alloy particles are immersed in an acid treating solution containing a cobalt compound and a copper compound, each in the amount of 0.1–5.0% by weight based on the weight of alloy particles, to remove oxide layers on alloy particle surfaces and deposit cobalt and copper reductively so that surface regions are formed at alloy particle surfaces.

In the first step, alloy particles are prepared having the crystal structure and compositional formula as specified above. Those alloy particles are generally prepared by adding specific types of metals to a Misch metal consisting of a mixture of rare-earth metals. The technique used to prepare such alloy particles is not particularly specified. They may be prepared by casting the metal mixture into an ingot and then subdividing the ingot, or alternatively, by utilizing a gas atomizing or roll quenching technique. In view of sinterability of resulting alloy particles, the use of gas atomizing technique is preferred.

In the second step, the alloy particles are immersed in an acid treating solution containing a cobalt compound and a copper compound each in the amount of 0.1–5.0% by weight, based on the weight of alloy particles. This treatment not only removes oxide layers from alloy particle surfaces but also allows reductive deposition of cobalt and copper, resulting in the formation of surface regions at the alloy particle surfaces. Examples of acids useful for preparation of the acid treating solution include hydrochloric acid, nitric acid and phosphoric acid.

Examples of cobalt and copper compounds for addition to the acid treating solution include cobalt chloride ($CoCl_2$), cobalt hydroxide ($Co(OH)_2$), copper chloride ($CuCl_2$) and copper hydroxide ($Cu(OH)_2$).

The cobalt and copper compounds are incorporated in the acid treating solution in concentrations of 0.1–5.0% by weight, respectively, for the reasons which follow. The respective loadings thereof, if exceed 5.0% by weight, cause cobalt and copper to be deposited in excessively large amounts that result in the increased tendency of alloy particles to be oxidized and, if fall below 0.1% by weight, cause cobalt and copper to be deposited in small amounts that result in the difficulty to satisfy the relationship $a/b \geq 1.3$. More preferably, the cobalt and copper compounds are incorporated in the acid treating solution in concentrations of 0.3–5.0% by weight, respectively.

Preferably, the acid treating solution is initially maintained at a pH in the range of 0.7–2.0. The pH of below 0.7 in some cases causes rapid oxidation of alloy particles that may dissolve even an interior of the hydrogen storage alloy. On the other hand, the pH of greater than 2.0 may result in the insufficient removal of oxide layers.

The acid treating solution may further contain at least one organic additive selected from the group consisting of 2,2'-bipyridyl, diethyldithio carbamate, 2-mercaptobenzothiazole and metanilic yellow. Such organic additives, if present, promote reductive deposition of cobalt and copper. The organic additive may preferably be incorporated in the amount of 5–50 ppm and contributes to further improvement of battery characteristics if kept within the specific range.

The method of producing a hydrogen storage alloy for use in alkaline storage batteries, in accordance with the present invention, is characterized as including the step of loading the hydrogen storage alloy of the present invention in an electrically conductive substrate such as a punching metal.

BEST MODE FOR CARRYING OUT THE INVENTION

Examples and Comparative Examples of the present invention are described below in detail. However, the present invention is not limited to the following Examples and can be practiced by adding suitable modifications within the range that does not depart from the gist of the present invention.

Figure 1:
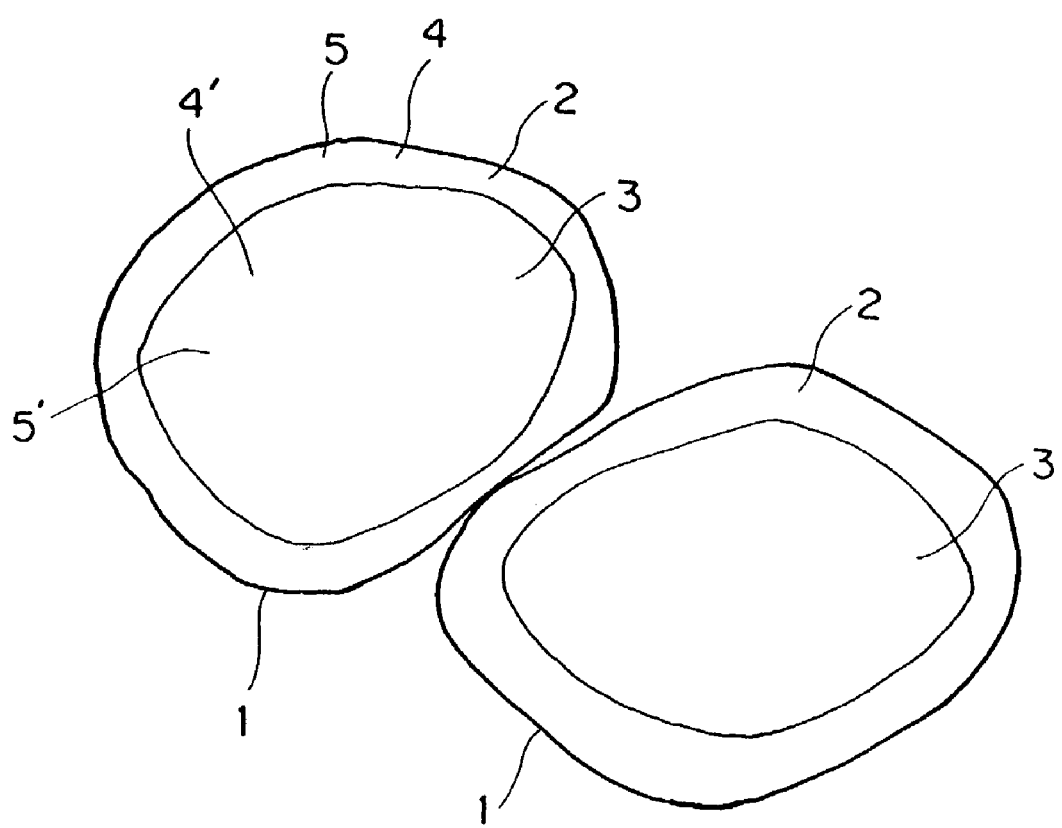
FIG. 1 is a schematic sectional view illustrating hydrogen storage alloy particles of the present invention.

FIG. 1 is a schematic sectional view, illustrating hydrogen storage alloy particles of the present invention. The hydrogen storage alloy particles 1 are configured such that each includes a bulk region 3 and a surface region 2 located toward a surface to surround the bulk region 3. Accordingly, the bulk region 3 is enclosed by the surface region 2. As shown in FIG. 1, the depth of the surface region 2 is not necessarily consistent and may be varied from location to location. In general, the surface region 2 extends from its surface mostly to the depth of 80 nm.

In the present invention, when the sum of percentages by number (atomic %) of cobalt atoms 4 and copper atoms 5 present in the surface region 2 is given by a and the sum of percentages by number (atomic %) of cobalt atoms 4' and copper atoms 5' present in the bulk region 3 is given by b, the relationship $a/b \geq 1.3$ is satisfied.

The bulk region 3 is a region which has a $CaCu_5$-type crystal structure and a substantially uniform composition, while the surface region 2 is a region which has been formed by the aforestated treatment with the acid solution and has a composition different from that of the bulk region 3. The surface region 2 generally has a composition gradient such that cobalt atoms 4 and copper atoms 5 are more concentrated toward a surface. Accordingly, the percentages by weight (atomic %) of cobalt atoms 4 and copper atoms 5 present in the surface region 2 is given by average values. Generally, the percentages by number of cobalt and copper atoms present in the vicinity of an intermediate depth of the surface region 2 determine those average values. Preferably, the percentages by number of cobalt atoms 4 and copper atoms 5 are determined from measurements at several locations within the surface region 2.

EXPERIMENT 1

In this Experiment 1, various hydrogen storage alloys, for use in alkaline storage batteries, were determined for the sum, a, of percentages by number (atomic %) of cobalt and copper atoms present in the surface region, and the sum, b, of percentages by number (atomic %) of cobalt and copper atoms present in the bulk region located interior of each hydrogen storage alloy particle. After calculation of a/b, its relation to battery characteristics was investigated.

Descriptions follow in the order of preparation of alloy particles, preparation of samples, assembly of alkaline storage batteries and detailed analysis.

(Preparation of $MmNi_{3.1}Co_{0.9}Mn_{0.6}M_{0.4}$ Alloy Particles)

Mm (Misch metal, a mixture of rare-earth metals, consisting, by weight, of 25% La, 50% Ce, 7% Pr and 18% Nd), and Ni, Co, Mn and Al (99.9% pure metal used for each), as starting materials, were mixed in a molar ratio of 1.0:3.1: 0.9:0.6:0.4, allowed to melt in an electric arc furnace under argon atmosphere and then cooled naturally to produce an ingot represented by the compositional formula $MmNi_{3.1}Co_{0.9}Mn_{0.6}M_{0.4}$. This ingot was mechanically subdivided in the air in such a controlled fashion as to provide alloy particles having an average particle size of 80 μm.

SAMPLES A1–A6 AND SAMPLE X

A cobalt compound, cobalt chloride ($CoCl_2$), was added to an aqueous solution of hydrochloric acid in the amount of 0.1% by weight, based on the weight of alloy particles to be treated. A copper compound, copper chloride ($CuCl_2$), was also added to the aqueous solution of hydrochloric acid in the amount as indicated in Table 1, based on the weight of alloy particles to be treated. The above procedures result in an acid treating solution having a pH of 1.0. The alloy particles were immersed in the above-prepared acid treating solution maintained at 25° C., agitated for 30 minutes, and then suction filtered. After filtration, the alloy particles were washed with water and dried. As a result, hydrogen storage alloy samples A1–A6 were obtained.

For comparative purposes, an aqueous solution of hydrochloric acid having a pH of 1.0, exclusive of cobalt chloride and copper chloride, was prepared. The alloy particles were immersed in this aqueous solution of hydrochloric acid maintained at 25° C. and agitated for 30 minutes. After suction filtration, the alloy particles were washed with water and dried. As a result, an hydrogen storage alloy sample X was obtained.

(Assembly of Batteries)

100 parts by weight of each of the above-obtained hydrogen storage alloy samples and 20 parts by weight of a 5 wt. % solution of PEO (polyethylene oxide) in water, as a binder, were mixed to prepare a paste. This paste was applied (loaded) onto opposite sides of an electrically conductive substrate comprised of a nickel-plated punching metal which was subsequently dried at room temperature and cut to a specified size. As a result, hydrogen storage alloy electrodes suitable for use in alkaline storage batteries were fabricated.

An AA-size positive limited alkaline storage battery (battery capacity of 1,000 mAh) was assembled by using each hydrogen storage alloy electrode as a negative electrode. The alkaline storage battery also used a conventionally known sintered type nickel plate for a positive electrode, an alkali-resistant nonwoven fabric for a separator and a 30 wt. % aqueous solution of potassium hydroxide for a liquid electrolyte.

Figure 2:
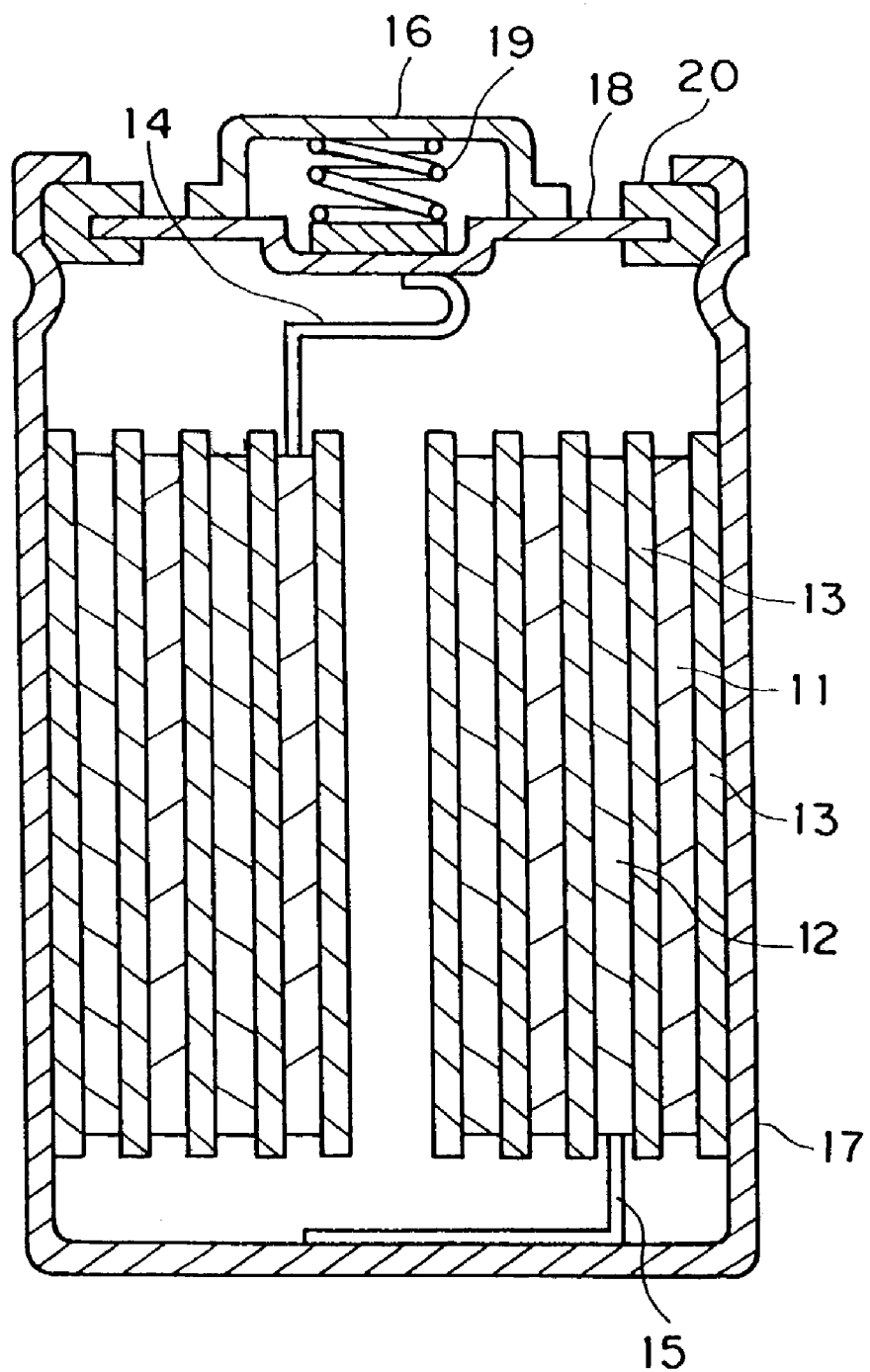
FIG. 2 is a diagrammatic sectional view illustrating an alkaline storage battery.

FIG. 2 is a diagrammatic sectional view of an alkaline storage battery construction as assembled. The alkaline storage battery includes a positive electrode 11, a negative electrode 12, a separator 13, a positive lead 14, a negative lead 15, a positive external terminal 16, a negative case 17 and a sealing cover 18.

The positive electrode 11 and negative electrode 12 are accommodated within the negative case 17 in a spirally wound configuration with the separator 13 between them. The positive lead 14 couples the positive electrode 11 to the sealing cover 18. The negative lead 15 couples the negative electrode 12 to the negative case 17. An insulating gasket 20 is provided to make a pressure-tight joint between the sealing cover 18 and the negative case 17, so that the battery is closed. Placed between the positive external terminal 16 and the sealing cover 18 is a coil spring 19 which is compressed responsive to the abnormal build-up of a battery's internal pressure to release a gas within the battery to outside.

DETAILED ANALYSIS

The hydrogen storage alloy samples A1–A6 and the comparative hydrogen storage alloy sample X were measured for percentages by number of atoms of elements present therein by using a scanning transmission electron microscope and an energy dispersive X-ray analyzer. The percentage by number of atoms of an element, as used herein, refers to a ratio of the number of atoms of each element to the total number of atoms of all the elements as detected by the scanning transmission electron microscope and the energy dispersive X-ray analyzer, and is generally represented by the unit of atomic %.

A measurement sample was prepared by slicing an alloy particle representative of each hydrogen storage alloy sample. A centrally located region of the measurement sample that had a $CaCu_5$-type crystal structure and a substantially uniform composition was defined as the bulk region. The region surrounding the bulk region and having a graded composition was defined as the surface region. The percentage by number of atoms of each element present in the surface region was determined by the value measured at the intermediate depth thereof, as stated earlier.

In the manner as described above, the percentages by number of cobalt and copper atoms present in the surface region and their sum, a, as well as the percentages by number of cobalt and copper atoms present in the bulk region and their sum, b, were determined to calculate a value for a/b.

Specifically for the sample A1, the percentages by number of cobalt and copper atoms present in the surface region and their sum, a, were determined as being 17.1 atomic %, 2.3 atomic % and 19.4 atomic %, respectively. On the other hand, the percentages by number of cobalt and copper atoms present in the bulk region and their sum, b, were determined as being 14.9 atomic %, 0 atomic % (i.e., no copper atom detected) and 14.9 atomic %, respectively. The value for a/b was accordingly 1.30.

(Evaluation of Performance Characteristics)

Each battery was measured for discharge capacity after 500 cycles. Each battery was charged at the 0.2 C rate at room temperature for 6 hours and then discharged at the 0.2 C rate to 1.0 V. This unit cycle was repeated 500 times. The battery was charged once more to measure a 501st cycle discharge capacity (mAh) which was taken as the discharge capacity after 500 cycles.

The following procedure was used to evaluate internal pressure characteristics of batteries: Each battery was charged at the 1.0 C rate while monitoring its internal pressure. When the internal pressure reached 10 kgf/cm$^2$, the time (min) was recorded as being indicative of its internal pressure characteristics.

The following procedure was used to measure a high-rate discharge capacity: After activation, each battery was charged at the 0.2 C rate at room temperature for 6 hours and then discharged at the 6.0 C rate to 1.0 V to measure a capacity (mAh). The measured capacity (mAh) was recorded as the high-rate discharge capacity.

The measurement results, i.e., the ratio a/b, discharge capacity after 500 cycles, internal pressure characteristics and high-rate discharge characteristics, for each of the batteries incorporating the samples A1–A6 and comparative sample X, are given in Table 1.

TABLE 1

| Sample No. | CoCl$_2$, Parts by weight | CuCl$_2$, Parts by weight | Ratio a/b | Capacity (mAh) after 500 cycles | Internal pressure characteristics (min) | High-rate discharge capacity (mAh) |
|---|---|---|---|---|---|---|
| A1 | 0.1 | 0.1 | 1.30 | 760 | 130 | 805 |
| A2 | 0.1 | 0.5 | 1.32 | 765 | 135 | 805 |
| A3 | 0.1 | 1.0 | 1.34 | 770 | 135 | 805 |
| A4 | 0.1 | 3.0 | 1.35 | 770 | 135 | 805 |
| A5 | 0.1 | 5.0 | 1.36 | 775 | 135 | 805 |
| A6 | 0.1 | 7.0 | 1.36 | 740 | 120 | 790 |
| X | 0 | 0 | 1.28 | 720 | 110 | 770 |

For the samples A1–A6 in accordance with the present invention, respectively prepared via treatment with the aqueous solution of hydrochloric acid containing the cobalt compound, CoCl$_2$, and the copper compound, CuCl$_2$, the ratio a/b of the sum, a, of percentages by number of cobalt and copper atoms present in the surface region to the sum, b, of percentages by number of cobalt and copper atoms present in the bulk region was found to satisfy the relationship a/b ≧ 1.3.

The comparative sample X gave a value of 1.28 for a/b.

The batteries incorporating the samples A1–A6 that satisfied the relationship a/b ≧ 1.3 gave higher values for discharge capacity after 500 cycles and high-rate discharge capacity compared to the comparative battery incorporating the comparative sample X. They also exhibited superior internal pressure characteristics.

Next, the amount of cobalt chloride (CoCl$_2$) added to the acid treating solution was varied, by weight, to 0.5%, 1.0%, 3.0%, 5.0% and 7.0%, based on the weight of alloy particles to be treated, to investigate the effect of cobalt chloride loading on battery performance characteristics.

As indicated in Table 2, sample groups B1–B6, C1–C6, D1–D6, E1–E6 and F1–F6 correspond to the cases where cobalt chloride was added in the amount by weight of 0.5%, 1.0%, 3.0%, 5.0% and 7.0%, respectively.

The measurement results, i.e., compositional ratio a/b for each sample, and discharge capacity after 500 cycles, internal pressure characteristics and high-rate discharge capacity for each battery, are given in Table 2.

TABLE 2

| Sample No. | CoCl$_2$, Parts by weight | CuCl$_2$, Parts by weight | Ratio a/b | Capacity (mAh) after 500 cycles | Internal pressure characteristics (min) | High-rate discharge capacity (mAh) |
|---|---|---|---|---|---|---|
| B1 | 0.5 | 0.1 | 1.33 | 775 | 130 | 810 |
| B2 | 0.5 | 0.5 | 1.34 | 780 | 135 | 810 |
| B3 | 0.5 | 1.0 | 1.35 | 785 | 135 | 815 |
| B4 | 0.5 | 3.0 | 1.36 | 795 | 135 | 820 |
| B5 | 0.5 | 5.0 | 1.37 | 795 | 135 | 820 |
| B6 | 0.5 | 7.0 | 1.37 | 745 | 120 | 795 |
| C1 | 1.0 | 0.1 | 1.35 | 795 | 130 | 810 |
| C2 | 1.0 | 0.5 | 1.36 | 795 | 135 | 815 |
| C3 | 1.0 | 1.0 | 1.37 | 800 | 135 | 820 |
| C4 | 1.0 | 3.0 | 1.38 | 805 | 140 | 820 |
| C5 | 1.0 | 5.0 | 1.39 | 805 | 135 | 820 |
| C6 | 1.0 | 7.0 | 1.39 | 755 | 120 | 795 |
| D1 | 3.0 | 0.1 | 1.36 | 800 | 130 | 810 |
| D2 | 3.0 | 0.5 | 1.36 | 805 | 135 | 820 |
| D3 | 3.0 | 1.0 | 1.38 | 810 | 135 | 825 |
| D4 | 3.0 | 3.0 | 1.40 | 820 | 140 | 820 |
| D5 | 3.0 | 5.0 | 1.41 | 820 | 145 | 820 |
| D6 | 3.0 | 7.0 | 1.41 | 755 | 125 | 800 |
| E1 | 5.0 | 0.1 | 1.39 | 805 | 130 | 810 |
| E2 | 5.0 | 0.5 | 1.40 | 805 | 130 | 820 |
| E3 | 5.0 | 1.0 | 1.41 | 810 | 135 | 820 |
| E4 | 5.0 | 3.0 | 1.42 | 815 | 145 | 820 |
| E5 | 5.0 | 5.0 | 1.43 | 810 | 135 | 810 |
| E6 | 5.0 | 7.0 | 1.43 | 750 | 125 | 790 |
| F1 | 7.0 | 0.1 | 1.39 | 755 | 130 | 800 |
| F2 | 7.0 | 0.5 | 1.40 | 750 | 125 | 795 |
| F3 | 7.0 | 1.0 | 1.41 | 750 | 125 | 795 |
| F4 | 7.0 | 3.0 | 1.41 | 745 | 125 | 795 |
| F5 | 7.0 | 5.0 | 1.41 | 740 | 120 | 795 |
| F6 | 7.0 | 7.0 | 1.41 | 735 | 115 | 790 |

As apparent from the results shown in Table 2, the batteries incorporating samples containing 0.1–5.0% by weight of copper chloride, i.e., samples B1–B5, C1–C5, D1–D5, E1–E5 and F1–F5, show high values for discharge capacity after 500 cycles, 740 mAh and greater. They also show high values for high-rate discharge capacity, 795 mAh and greater. It is thus understood that the cobalt chloride loading is preferably in the range of 0.1–5.0% by weight.

Based also on the results shown in Table 1, it is understood that the preferred loadings of cobalt and copper compounds are both in the range of 0.1–5.0% by weight.

Although cobalt chloride and copper chloride were used in the Experiment 1 for the cobalt and copper compounds, the similar results are obtained with the use of other types of cobalt and copper compounds, such as cobalt hydroxide (Co(OH)$_2$) and copper hydroxide (Cu(OH)$_2$).

Although an aqueous solution of hydrochloric acid was used as the acid treating solution in the producing step of hydrogen storage alloy, i.e., in step 2 of Experiment 1, the similar trend is observed with the use of nitric acid or phosphoric acid.

EXPERIMENT 2

In this Experiment 2, the effect of a pH of the acid treating solution on battery performances was investigated by varying the amount of hydrochloric acid added to the acid treating solution in step 2. Here, cobalt chloride was used for the cobalt compound and copper chloride for the copper compound.

First, an aqueous solution of hydrochloric acid was prepared which contained cobalt chloride and copper chloride in the amounts indicated in Table 2, respectively based on the weight of alloy particles to be treated, and which was maintained at a pH in the range of 0.3–2.5 by controlled addition of hydrochloric acid. The alloy particles produced in the above Experiment 1 were added to the above-prepared aqueous hydrochloric acid solution, stirred for 30 minutes, suction filtered, washed with water and then dried. Each type of chloride compound was added to the samples G1–G5 in the amount of 0.5% by weight, to the samples H1–H5 in the amount of 1.0% by weight, to the samples J1–J5 in the amount of 3.0% by weight, and to the samples K1–K5 in the amount of 5.0% by weight. The procedure of Experiment 1 was repeated using these samples to assemble batteries. The measurement results of discharge capacity after 500 cycles, internal pressure characteristics and high-rate discharge capacity for each battery are given in Table 3.

TABLE 3

| Sample No. | $CoCl_2$, Parts by weight | $CuCl_2$, Parts by weight | pH of Treating solution | Capacity (mAh) after 500 cycles | Internal pressure characteristics (min) | High-rate discharge capacity (mAh) |
|---|---|---|---|---|---|---|
| G1 | 0.5 | 0.5 | 0.3 | 730 | 115 | 775 |
| G2 | 0.5 | 0.5 | 0.7 | 780 | 135 | 805 |
| G3 | 0.5 | 0.5 | 1.0 | 780 | 135 | 810 |
| G4 | 0.5 | 0.5 | 2.0 | 775 | 135 | 805 |
| G5 | 0.5 | 0.5 | 2.5 | 740 | 135 | 780 |
| H1 | 1.0 | 1.0 | 0.3 | 750 | 120 | 780 |
| H2 | 1.0 | 1.0 | 0.7 | 800 | 120 | 820 |
| H3 | 1.0 | 1.0 | 1.0 | 800 | 135 | 820 |
| H4 | 1.0 | 1.0 | 2.0 | 800 | 135 | 820 |
| H5 | 1.0 | 1.0 | 2.5 | 750 | 130 | 780 |
| J1 | 3.0 | 3.0 | 0.3 | 750 | 120 | 780 |
| J2 | 3.0 | 3.0 | 0.7 | 820 | 120 | 820 |
| J3 | 3.0 | 3.0 | 1.0 | 820 | 140 | 820 |
| J4 | 3.0 | 3.0 | 2.0 | 815 | 140 | 820 |
| J5 | 3.0 | 3.0 | 2.5 | 750 | 140 | 775 |
| K1 | 5.0 | 5.0 | 0.3 | 750 | 120 | 775 |
| K2 | 5.0 | 5.0 | 0.7 | 810 | 120 | 810 |
| K3 | 5.0 | 5.0 | 1.0 | 810 | 135 | 810 |
| K4 | 5.0 | 5.0 | 2.0 | 810 | 130 | 810 |
| K5 | 5.0 | 5.0 | 2.5 | 745 | 120 | 775 |

As apparent from the results shown in Table 3, the batteries incorporating samples treated with the acid treating solution having a pH kept within the range of 0.7–2.0, i.e., samples G2–G4, H2–H4, J2–J4 and K1–K4, show high values for discharge capacity after 500 cycles, 780 mAh and greater. They also show high values for high-rate discharge capacity, 805 mAh and greater. These demonstrate that the pH of the acid solution is preferably kept within the range of 0.7–2.0.

Although an aqueous solution of hydrochloric acid was used as the acid treating solution in step 2 of Experiment 2, the similar trend is observed with the use of nitric acid or phosphoric acid.

Although cobalt chloride and cobalt hydroxide were used in Experiment 2 for the cobalt and copper compounds, the similar results are obtained with the use of other types of cobalt and copper compound, such as cobalt hydroxide and copper hydroxide.

EXPERIMENT 3

In this Experiment 3, the effect of inclusion of an organic additive in the acid treating solution on battery performance characteristics was investigated by varying the amount of 2,2'-bipyridyl, as a representing organic additive added to the acid treating solution in step 2. Here, cobalt chloride was used for the cobalt compound and copper chloride for the copper compound.

First, an aqueous hydrochloric acid solution having a pH of 1.0 was prepared which contained cobalt chloride and copper chloride each in the amount of 1.0% or 3.0% by weight and 2,2'-bipyridyl in the amount indicated in Table 4, respectively based on the weight of alloy particles to be treated. The alloy particles produced in Experiment 1 were immersed in the above-prepared aqueous hydrochloric acid solution, stirred for 30 minutes, suction filtered, washed with water and then dried. As a result, samples L1–L6 and M1–M6 were obtained. The procedure of Experiment 1 was repeated using these samples to assemble batteries. Each battery was measured for discharge capacity after 500 cycles, internal pressure characteristics and high-rate discharge capacity. The measurement results are given in Table 4.

TABLE 4

| Sample No. | $CoCl_2$, Parts by weight | $CuCl_2$, Parts by weight | 2,2'-bipyridyl (ppm) | Capacity (mAh) after 500 cycles | Internal pressure characteristics (min) | High-rate discharge capacity (mAh) |
|---|---|---|---|---|---|---|
| L1 | 1.0 | 1.0 | 0 | 800 | 135 | 820 |
| L2 | 1.0 | 1.0 | 1.0 | 805 | 135 | 820 |
| L3 | 1.0 | 1.0 | 5.0 | 810 | 140 | 825 |
| L4 | 1.0 | 1.0 | 10.0 | 820 | 140 | 830 |
| L5 | 1.0 | 1.0 | 50.0 | 810 | 140 | 825 |
| L6 | 1.0 | 1.0 | 100.0 | 800 | 135 | 820 |
| M1 | 3.0 | 3.0 | 0 | 820 | 140 | 820 |
| M2 | 3.0 | 3.0 | 1.0 | 825 | 140 | 820 |
| M3 | 3.0 | 3.0 | 5.0 | 830 | 140 | 830 |
| M4 | 3.0 | 3.0 | 10.0 | 840 | 145 | 840 |
| M5 | 3.0 | 3.0 | 50.0 | 830 | 140 | 830 |
| M6 | 3.0 | 3.0 | 100.0 | 820 | 140 | 820 |

As apparent from the results shown in Table 4, the use of samples treated with the acid treating solution containing the organic additive, 2,2'-bipyridyl, in concentrations of 1.0–50.0 ppm results in the improved battery performance characteristics. The addition of organic additive in the amount of 5.0–50.0 ppm is particularly preferred.

Although 2,2'-bipyridyl was used as a representative organic additive in Experiment 3, the similar results are obtained with the use of other types of organic additives, such as diethyldithio carbamate, 2-mercaptobenzothiazole and metanilic yellow.

The alloy particles used in the above Experiments were those produced by allowing a mixture of constituent metals to melt in an electric arc furnace under argon atmosphere and then cool into an ingot and mechanically subdividing the ingot. The similar results are obtained with the use of alloy particles produced according to a gas atomizing or roll quenching technique.

The present invention can sustain the activity of alloy particle surfaces and improve the electrical conductivity between alloy particles. An electrode fabricated from such alloy particles, when used as a negative electrode of a nickel-hydrogen storage battery, can provide an excellent charge-discharge cycle life performance, prevent the buildup of battery's internal pressure during overcharge and improve high-rate discharge characteristics.

The invention claimed is:

1. A method for production of a hydrogen storage alloy, for use in alkaline storage batteries, including:
   a first step of preparing alloy particles having a $CaCu_5$-type crystal structure and represented by the compositional formula $MmNi_xCO_yMn_zM_{1-z}$, wherein N represents at least one element selected from the group consisting of aluminum (Al) and copper (Cu), x is a nickel (Ni) stoichiometry and satisfies $3.0 \leq x \leq 5.2$, y is a cobalt (Co) stoichiometry and satisfies $0 \leq y \leq 1.2$, z is a manganese (Mn) stoichiometry and satisfies $0.1 \leq z \leq 0.9$, and the sum of x, y and z satisfies $4.4 \leq x+y+z \leq 5.4$; and a second step of immersing said alloy particles in an acid treating solution containing a cobalt compound and a copper compound, each in an amount of 0.1–5.0% by weight based on the weight of said alloy particles, and an organic additive to thereby remove oxide films on alloy particle surfaces of said alloy particles and also reductively deposit cobalt and copper so as to form surface regions at said alloy particle surfaces;

wherein each said surface region respectively surrounds a bulk region of a respective one of said alloy particles having a $CaCu_5$-type crystal structure and wherein, when the sum of percentages by number of cobalt (Co) atoms and copper (Cu) atoms present in said surface region is given by a and the sum of percentages by number of cobalt (Co) atoms and copper (Cu) atoms present in said bulk region is given by b, the relationship $a/b \geq 1.3$ is satisfied.

2. The method for production of a hydrogen storage alloy as recited in claim 1, wherein said organic additive is at least one selected from the group consisting of 2,2'-bipyridyl, diethyldithio carbamate, 2-mercaptobenzothiazole and metanilic yellow.

3. The method for production of a hydrogen storage alloy as recited in claim 1, wherein said organic additive is incorporated in the acid treating solution in the amount of 5–50 ppm.

4. The method for production of a hydrogen storage alloy as recited in claim 1, wherein said acid treating solution has a pH of 0.7–2.0.

5. The method for production of a hydrogen storage alloy as recited in claim 1, wherein, in the first step, said alloy particles are prepared by a gas atomizing method.

6. A method for production of a hydrogen storage alloy electrode comprising loading the hydrogen storage alloy produced according to the method as recited in claim 1 in an electrically conductive substrate.

* * * * *

UNITED STATES PATENT AND TRADEMARK OFFICE
CERTIFICATE OF CORRECTION

PATENT NO. : 7,078,126 B2
APPLICATION NO. : 10/334287
DATED : July 18, 2006
INVENTOR(S) : Imoto et al.

It is certified that error appears in the above-identified patent and that said Letters Patent is hereby corrected as shown below:

Title page,
Item [75], Inventors,
Line 2, replace "Kuzatsu" by --Kusatsu--;

Column 2,
Line 39, after "region.", replace "As-described" by --As described--;

Column 5,
Line 30, replace "SAMPLE A1-A6 AND SAMPLE X" by --(Sample A1 - A6 and Sample X)--;

Column 6,
Line 25, replace "DETAILED ANALYSIS" by --(Detailed Analysis)--;

Column 10,
Line 65, after "wherein", replace "N" by --M--.

Signed and Sealed this

Sixth Day of March, 2007

JON W. DUDAS
*Director of the United States Patent and Trademark Office*